March 26, 1957  E. CORNING 2ND  2,786,295
FLY ROD LURE
Filed March 1, 1955
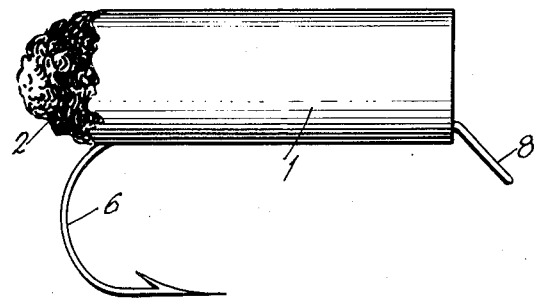
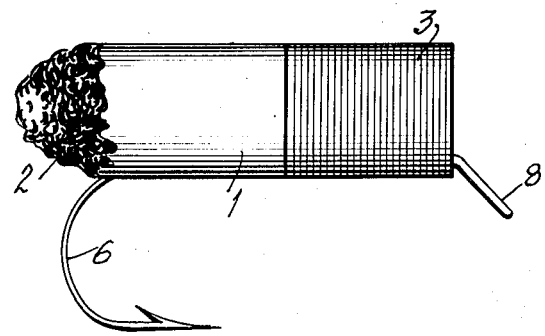
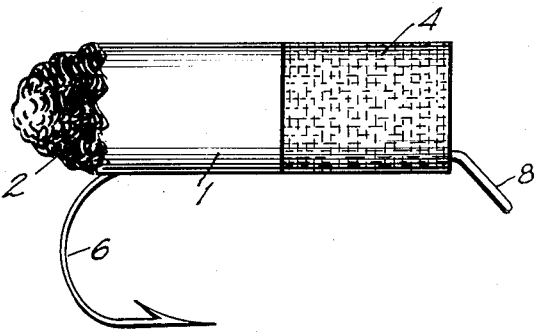
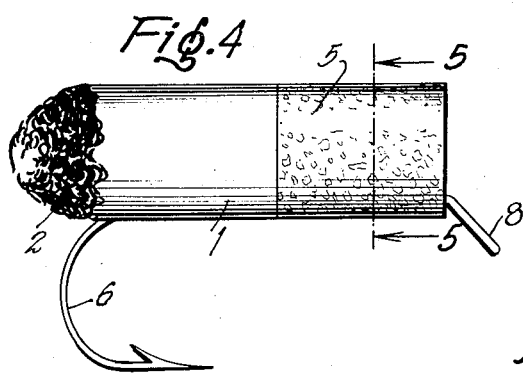
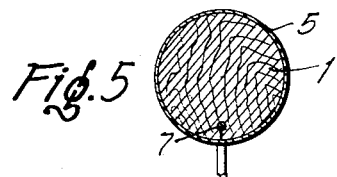
Inventor
Erastus Corning 2nd
by
His Attorneys

United States Patent Office 2,786,295
Patented Mar. 26, 1957

2,786,295

FLY ROD LURE

Erastus Corning 2nd, Albany, N. Y.

Application March 1, 1955, Serial No. 491,266

5 Claims. (Cl. 43—42.32)

My invention relates to fishing and particularly to a fish lure of a novel type which is especially adapted for casting with a fly rod.

Fish strike at a cigarette butt which has been thrown from a boat and is floating either in fresh or salt water.

The principal object of my invention is to provide a fly rod lure which will simulate a cigarette butt in its appearance. A further object is to provide such a lure which will float when cast in the water.

In the drawings Figs. 1, 2, 3 and 4 are side views of various species of my lure; and Fig. 5 is a section of Fig. 4 in the plane 5—5.

My lure is formed of cork, light wood or other material having a low specific gravity so that it is adapted to float on the surface of water. It is, of course, cylindrical in shape, of a diameter approximating that of an ordinary cigarette, and while the over-all length is not too critical, if made about 1¼ inches long, it will be very satisfactory.

In Fig. 1 I have shown the side view of a lure having its surface 1 painted white from end to end with an overlay of black marks 2 simulating the ash end of the butt.

In Fig. 2 I have shown a butt having a mouthpiece tip 3 of red paint or enamel.

In Fig. 3 the mouthpiece tip 4 is of gold; and in Fig. 4 the mouthpiece tip 5 simulates cork.

Each of the lures is of course provided with a fish hook 6, having the usual eye 8 for attaching it to a fishing line, which may be secured to the body by securing the shank 7 therein as shown in Fig. 5, or in any other suitable way.

My lures may be used with a fly rod in the same way as a dry fly or a so-called bass bug in casting for bass, trout, salmon and other varieties of fresh and salt water game fish.

While I have described my invention in its preferred embodiment it is to be understood that the words which I have used are words of description rather than of limitation and that changes within the purview of the appended claims may be made without departing from the true scope and spirit of my invention.

What I claim is:

1. A fish lure having the appearance of a cigarette butt and comprising a generally cylindrical body formed of material which will float in water; said body being white in color throughout the major portion of the length thereof but having at one end a portion having the shape and color of the ash end of a cigarette butt; a fish hook attached to said lure; and means for attaching a fishing line to said lure.

2. A fish lure having the appearance of a cigarette butt and comprising a generally cylindrical body formed of material which will float in water; said body being white in color throughout the major portion of the length thereof but having at one end a portion having the shape and color of the ash end of a cigarette butt, and at the other end a portion colored to simulate the mouthpiece tip end of a cigarette; a fish hook attached to said lure; and means for attaching a fishing line to said lure.

3. The structure set forth in claim 2 in which the mouthpiece tip end is colored red.

4. The structure set forth in claim 2 in which the mouthpiece tip end is colored to simulate cork.

5. The structure set forth in claim 2 in which the mouthpiece tip end is colored to simulate gold.

References Cited in the file of this patent

UNITED STATES PATENTS

| | | |
|---|---|---|
| 1,007,755 | Turgeon | Nov. 7, 1911 |
| 1,933,170 | Greider | Oct. 31, 1933 |
| 2,045,703 | Du Bois | June 30, 1936 |
| 2,475,101 | Kosash | July 5, 1949 |

OTHER REFERENCES

Popular Mechanics booklet, "How to tempt a fish," page 20, published 1950 by Popular Mechanics Co., Chicago, Ill.